Nov. 26, 1929.   C. A. ROBINSON   1,737,096
CLOTHES HANGER OR THE LIKE
Filed Oct. 15, 1928
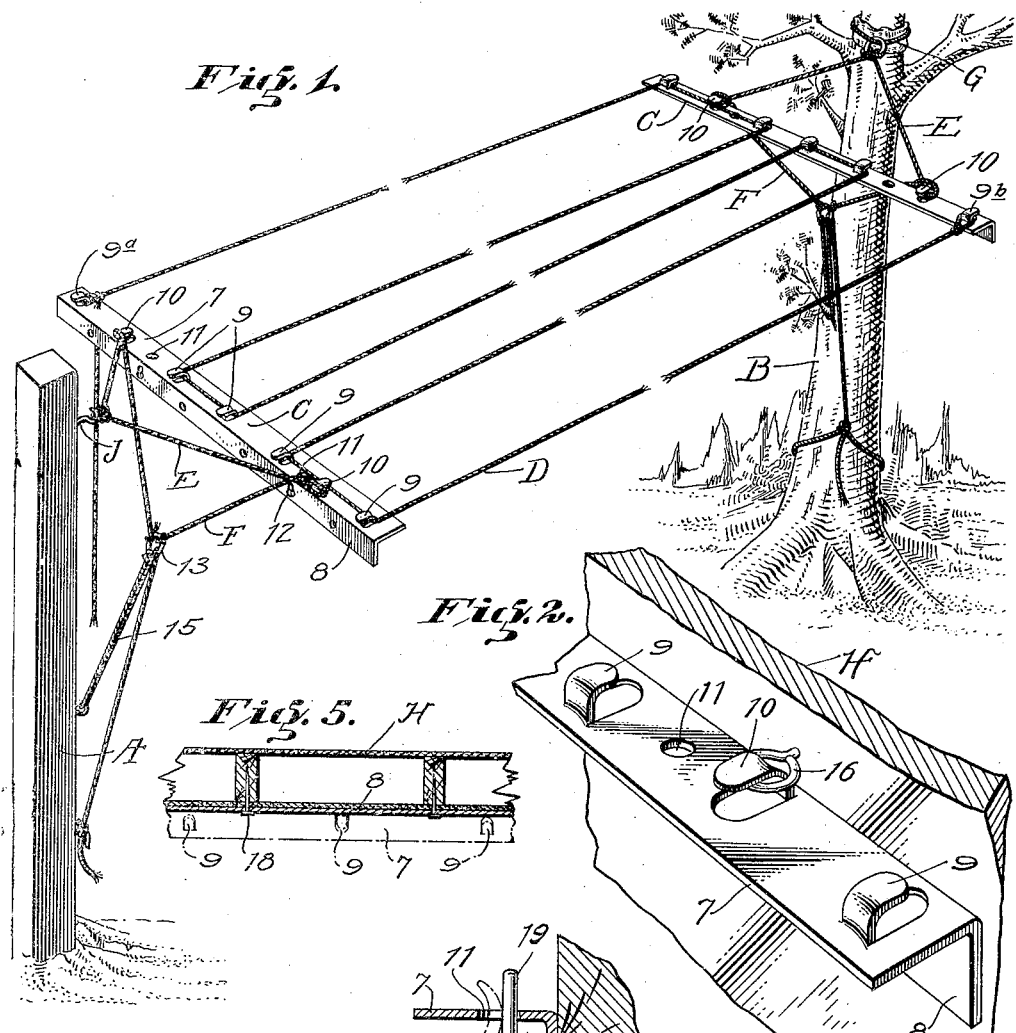
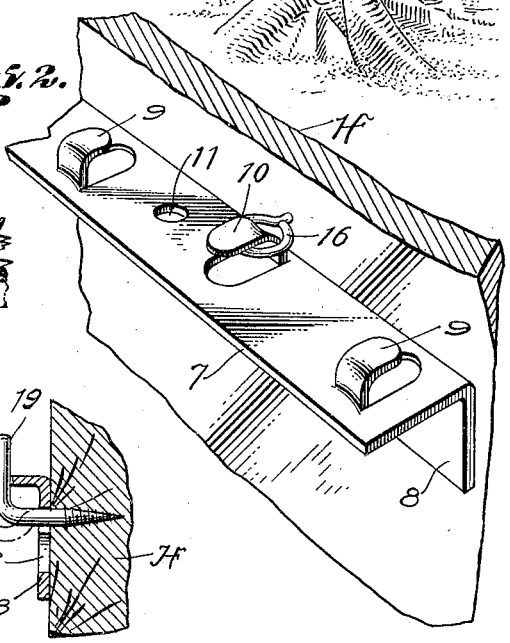
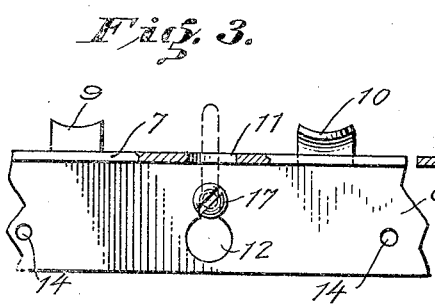
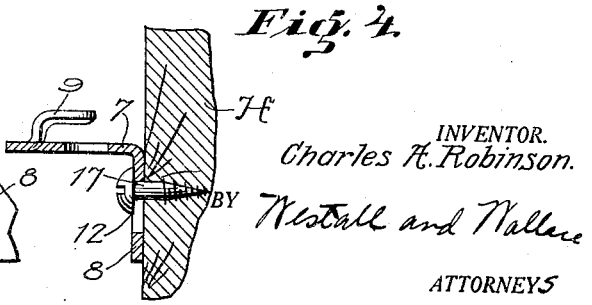
INVENTOR.
Charles A. Robinson.
BY Westall and Wallace
ATTORNEYS Patented Nov. 26, 1929

1,737,096

UNITED STATES PATENT OFFICE

CHARLES ALFRED ROBINSON, OF GOLETA, CALIFORNIA

CLOTHES HANGER OR THE LIKE

Application filed October 15, 1928. Serial No. 312,470.

This invention relates to a device having spaced parallel rack bars between which are strung a multiplicity of lines. The present invention is especially adapted for incorporation in a clothes hanger or line, although not limited to such use. In clothes lines and the like, it is desirable to have a multiplicity of parallel lines maintained taut and capable of being expeditiously strung and unstrung. Where rope is used, stretching occurs with use and under various climatic changes. The present invention contemplates a structure in which the lines may be tightened with ease.

The objects of this invention are to provide a multiple line device having any or all of the following features: a pair of rack bars for attachment thereto of a line adapted for support upon walls, trees or posts; rack bars which include means for passing a single line therearound to provide strings arranged side by side; rack bars of transverse angle section and of metal with hooks upset therefrom for reception of the lines in stringing; metallic rack bars of transverse angle section with hooks upset therefrom facing in one direction for the line to be strung and hooks upset therefrom facing in the opposite direction for hitch lines to support the rack bars on posts or the like and for attachment of tightener lines to hold the strung line taut. In addition to the broader objects of this invention, there are certain details of structure, whereby a simple and economical structure easy to install is obtained.

These objects together with other objects and corresponding accomplishment are obtained by means of the embodiments of my invention illustrated in the accompanying drawings, in which:

Fig. 1 is a perspective view of a clothes line supported by a post and a tree; Fig. 2 is a perspective view showing a fragment of a wall, a rack bar attached thereto by eyes and equipped with hitch hooks; Fig. 3 is a front elevation of a rack bar supported upon a wire by means of screws; Fig. 4 is a vertical section through the structure shown in Fig. 3; Fig. 5 is a plan view in section of the construction shown in Figs. 3 and 4; and Fig. 6 is a vertical section of the type of bar shown in Fig. 3, supported by wall hooks.

Referring with more particularity to the drawings and especially to Fig. 1, A marks a post and B a tree between which is hung my improved device. The device comprises spaced rack bars C which are duplicates of one another and a line D strung between the bars to provide a multiplicity of parallel supporting strings. The bars are attached to the posts and tree by similar means, each consisting of a hitch loop E and a tightener loop F. The hitch loop is attached to the post by means of a hook secured thereto and to the tree by a line G encircling the trunk of the tree and provided with a ring. In order to prevent abrasion of the tree by the line G, a shield is provided, and this may consist of fabric such as rubber or a portion of an automobile casing.

Each rack bar is preferably formed of a metallic angle bar having flanges 7 and 8. Punched and upset from the flange 7 are hooks 9 with their mouths facing the rear or flange 8. These hooks are suitably spaced in accordance with the desired spacing of the supporting strings. Intermediate the ends of the bar are hitch hooks 10 upset from flange 7 and with their mouths facing in the opposite direction to hooks 9. To provide for supporting the rack bar upon a wall marked H by means of hooks, I have provided holes 11 in the flange 7. To further provide for detachably mounting the racks upon a wall H by means of screws, holes 12 are provided in the flange 8. These holes are large enough to permit the passage of a screwhead, and a reduced portion is provided to receive the shank of a screw. Holes 14 are also provided in the flange 8 whereby the bar may be attached to a wall in a more permanent manner as by means of nails or screws.

Referring again to Fig. 1, the rack bars are placed in position opposite to one another, and the line D tied to one hook on one bar and then strung around a hook 9 and tied to another hook 9ᵈ.

A hitch loop is then attached to each bar by tying the ends of a loop line E to hitch hooks 10, one of the lines being passed over a hook J and the other through the ring on line G. The strung line is then tightened by fastening the ends of tightener lines F to hitch hooks 10, the tightener loops having rings 13 through which are passed lines 15, one end of each being attached to the post or tree, and the other end being then pulled taut and attached to the post or tree, thus causing the lines between the rack bars to be tightened. Thus, tackle is provided for tightening and stabilizing the hanger and adapting it to use in any location. The hanger is portable and not dependent upon a fixed anchorage.

Referring to Fig. 2, the bar is shown directly fastened to a wall H. Eyes 16 are attached to the wall so that the hitch hooks 10 may be engaged therewith. Referring to Figs. 3 and 4, a rack bar is shown attached to a wall H by means of screws 17. These screws extend from the wall such a distance that a flange 8 may be slipped over and behind the heads of the screws. In Fig. 5, a bar is shown attached by means of nails 18 passed through the openings 14 in flange 8. In Fig. 6, still another means of detachably fastening the rack bar to the wall H is shown. In the latter case, the hooks 19 are secured to the wall, and the rack bar slipped into position by passing the hooks through openings 12 and then through openings 11. Various other means may be employed to fasten the rack bars to the wall without departing from my invention.

What I claim is:

A portable clothes line hanger comprising metallic angle bars, each bar having hooks upset from one flange with their mouths facing the other flange and hitch hooks upset from said first mentioned flange and facing in the opposite direction to said first mentioned hooks, hitch tackle engaged with hitch hooks for attaching said bars to spaced supports and a line passed around said first mentioned hooks and strung between said bars to provide multiple strings.

In witness that I claim the foregoing I have hereunto subscribed my name this 3rd day of October, 1928.

CHARLES ALFRED ROBINSON.